Feb. 10, 1970   E. J. KOSKI   3,493,993
STRIP CRIMPER AND CUTTER
Filed Sept. 26, 1966
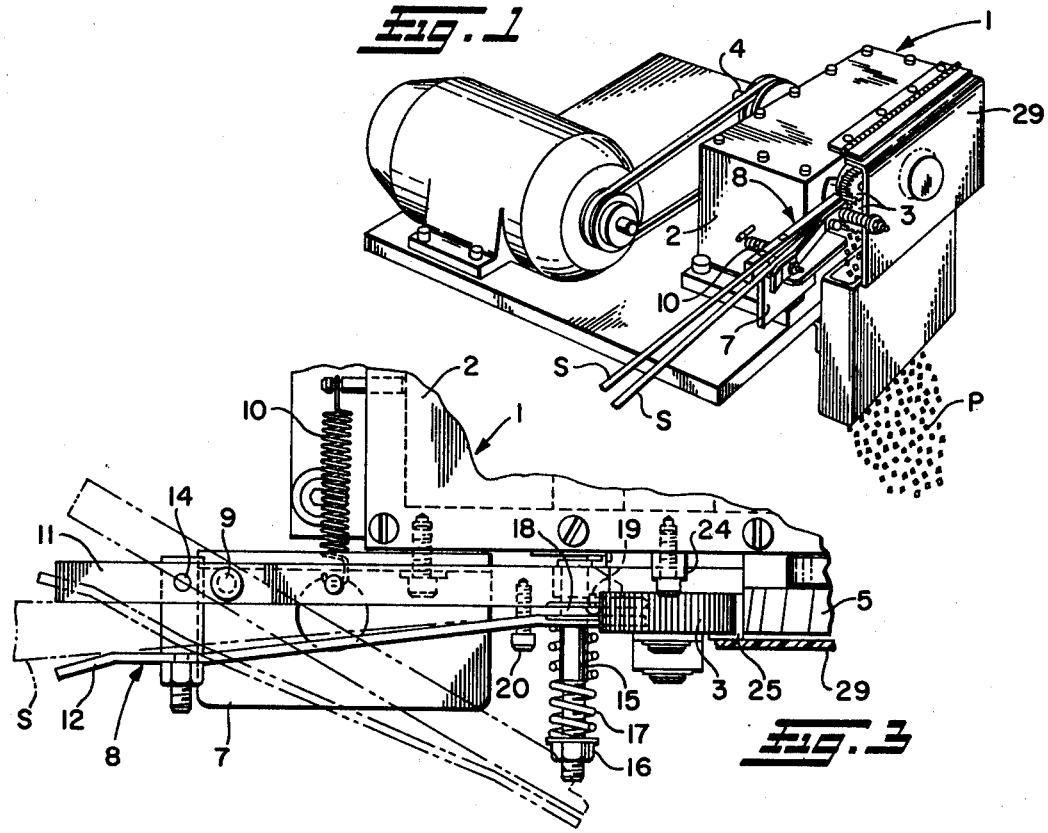
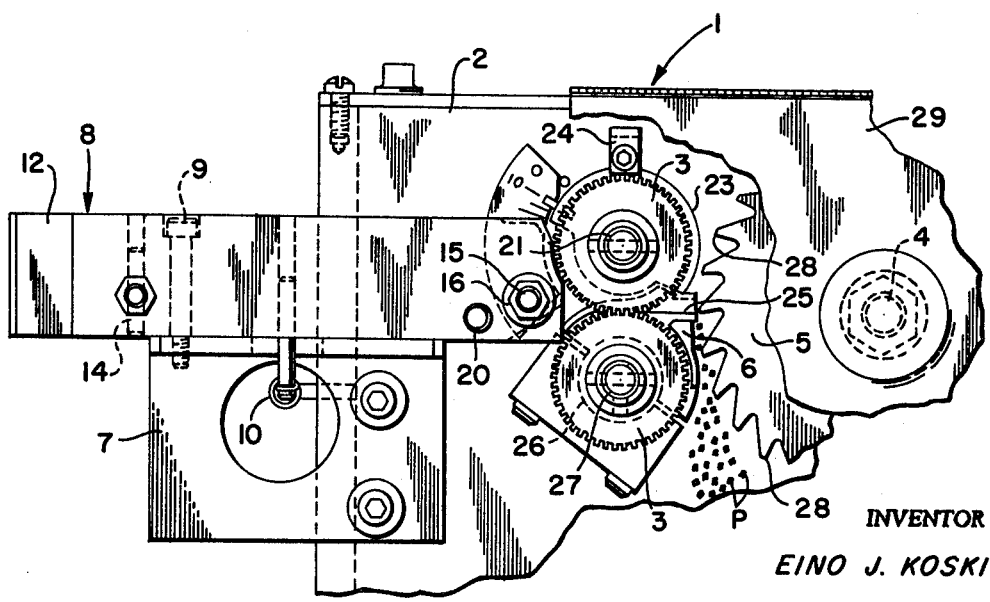
INVENTOR
EINO J. KOSKI
BY Oberlin, Maky & Donnelly
ATTORNEYS United States Patent Office 3,493,993
Patented Feb. 10, 1970

3,493,993
STRIP CRIMPER AND CUTTER
Eino J. Koski, Cuyahoga Falls, Ohio, assignor, by mesne assignments, to NRM Corporation, Akron, Ohio, a corporation of Ohio
Filed Sept. 26, 1966, Ser. No. 581,935
Int. Cl. B29c 17/02, 17/10
U.S. Cl. 18—4                                      7 Claims

ABSTRACT OF THE DISCLOSURE

A guide member for use in apparatus for gathering, crimping, and cutting edge trim strips from plastic film and the like having converging walls terminating in a gap through which strips wider than the gap are adapted to be pulled longitudinally, one of the converging walls being disposed for yielding movement toward and away from the other wall to automatically vary the size of the gap therebetween as the width of the strips varies.

---

The present invention relates generally as indicated to a strip crimper and cutter and more particularly to a film scrap crimper and cutter which is equipped with a guide effective automatically to compact the edge trim as from plastic sheet or film to form a tight rope-like strip which passes between crimping rolls and is fed thereby to a cutter which cuts the crimped or corrugated rope into small pieces or pellets of uniform size.

In the making of plastic sheet or film whether by die extrusion or blown film extrusion, the edges of the film are trimmed to form finished plastic sheet or film of predetermined width. With the present apparatus the edge trim strips are fed thereto and are gathered, crimped, and cut into pellets for reprocessing. The edge trim strips are usually of varying width and therefore, if they are gathered in a guide of fixed dimension, the rope-like strip will be loose or insufficiently compacted when the edge trim strips are narrow and, conversely, breakage of the rope-like strip may occur when attempting to over-compact wide edge trim strips in such guide.

Accordingly, it is a principal object of this invention to provide an edge trim strip guide and compactor which is so constructed that predetermined compacting pressure is applied thereon irrespective of variation in width thereof, thus to uniformly produce a tight rope-like strip which then is fed by crimping rolls for cutting into uniform size and uniform density pellets.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a perspective view of a strip-crimper and cutter embodying the present invention;

FIG. 2 is a front elevation view; and

FIG. 3 is a fragmentary top plan view.

Referring to the drawing, the crimper and cutter 1 herein shown comprises a housing 2 having a pair of crimping rolls 3, 3 journalled therein and driven by gearing (not shown) within housing 2 from the motor-driven cutter shaft 4 which also is journalled in said housing 2. Mounted on said shaft 4 is the cutter 5 which cooperates with the anvil 6 to cut crimped rope-like plastic strip S into pellets P of uniform size.

The housing 2 is provided with a bracket 7 on which an edge trim guide and compactor member 8 is pivotally mounted on the pin 9 for swinging of the same to the dot-dash position shown in FIG. 3 to facilitate initial threading of the apparatus 1. A spring 10 yieldably holds the guide and compactor member 8 in the full line operating position.

The guide member 8 aforesaid comprises a rear plate 11 which is pivoted at 9 as aforesaid, and a front plate 12 which is pivoted to the rear plate by the pin 14. The rear plate 11, adjacent the crimping rolls 3, 3, has a forwardly projecting stud 15 extending through the front plate 12 and having a nut 16 adjustably threaded thereon. A spring 17 compressed between said nut 16 and said front plate 12 yieldably urges the front plate 12 toward the rear plate 11 to define a gap 18 through which the edge trim strips S pass for being laterally squeezed or compressed to form a tight rope-like strip. The minimum gap 18 is determined by the stop button 19 on the rear plate 11 and the maximum gap 18 is determined by the stop screw 20 of the rear plate 11 which is engaged by predetermined outward swinging movement of the front plate 12 about the pivot 14.

As evident, the nut 16 may be readily adjusted so that the spring 17 compacts the gathered edge trim strips S with predetermined force at the gap 18 between the rear and front plates 11 and 12 thus to form a rope-like strip of desired tightness and, of course, as the widths of the trim strips S vary the front plate 12 will move toward or away from the rear plate 11 to maintain the compacting load at the gap 18 within desired limits.

In setting up the apparatus 1, the operator will swing the guide member 8 outwardly to the dot-dash position of FIG. 3 and place the gathered edge trim strips S in the converging space between the rear and front plates 11 and 12 and in the gap 18. When the member 8 is released, spring 10 will pull it to the solid line position thus to place the leading end of the strips S between the crimping rolls 3, 3. For adjusting the amount of crimping of the strips S between the crimping rolls 3, 3, the shaft 21 of the roll 3 may be mounted in an eccentric bushing 23 to cause movement of said upper roll 3 toward or away from the lower roll 3 upon rotation of the bushing 23 in a clockwise or counterclockwise direction as viewed in FIG. 2. The eccentric bushing 23 is locked in desired adjusted position as by means of the screw actuated clamp 24. Thus, when the apparatus is placed in operation, the crimping rolls 3, 3 will crimp the rope-like strip and feed it longitudinally along the shoulder 25 of the anvil 6 toward the rotating cutter 5. In the present case, the anvil 6 may be sharpened as required from time to time and rotated on the bushing 26 of the shaft 27 of the lower roll 3 so that the edge of shoulder 25 is in close proximity to the cutting edges 28 of said cutter 5. When the cutter cover 29 is in the FIG. 1 position, it defines with the shoulder 25 an anvil passage through which the crimped rope-like strip is guided toward the periphery of the cutter 5 for cutting into uniform size and density pellets P which are suitable for blending with virgin material into an extruder or the like thus to eliminate waste of plastic material.

Other modes of applying the principle of the invention may be employed, change being made as regards the details described, provided the features stated in any of the following claims, or the equivalent of such, be employed.

I therefore particularly point out and distinctly claim as my invention:

1. Apparatus for gathering, crimping, and cutting edge trim strips from plastic film and the like comprising a guide member having converging walls terminating in a gap through which strips wider than such gap are adapted to be pulled longitudinally; crimping means adjacent to said guide member operative to crimp said strips and to pull them through said member; and cutting means adjacent to said crimping means operative to cut crimped strip fed thereto by said crimping means into pieces for reprocessing; one of the converging walls of said guide member being disposed for yielding movement toward and away from the other wall to automatically vary the size of such gap therebetween as the width of such strips varies, said guide member comprising opposed plates providing such converging walls and gap; said plates being pivotally connected together at a point spaced from the gap therebetween such that relative pivotal movement of said plates will vary the size of such gap.

2. The apparatus of claim 1 wherein spring means bearing on one of said plates yieldably urges it in a direction tending to decrease the size of such gap.

3. The apparatus of claim 2 wherein means are provided to adjust said spring means to apply a predetermined load on said strips as they are pulled through said member.

4. Apparatus for gathering, crimping, and cutting edge trim strips from plastic film and the like comprising a guide member having converging walls terminating in a gap through which strips wider than such gap are adapted to be pulled longitudinally; crimping means adjacent to said guide member operative to crimp such strips and to pull them through said guide member; cutting means adjacent to said crimping means operative to cut crimped strip fed thereto by said crimping means into pieces for reprocessing; and means mounting said guide member for pivotal swinging movement out of line with said crimping means to facilitate initial placement of such strips between said converging walls.

5. The apparatus of claim 4 further comprising spring means for yieldably retaining said guide member in line with said crimping means.

6. Apparatus for gathering, crimping, and cutting edge trim strips from plastic film and the like comprising a guide member having converging walls terminating in a gap through which strips wider than such gap are adapted to be pulled longitudinally; crimping means adjacent to said guide member operative to crimp said strips and to pull them through said member; and cutting means adjacent to said crimping means operative to cut crimped strip fed thereto by said crimping means into pieces for reprocessing; said guide member comprising opposed plates providing such converging walls and gap, one of said plates being movable relative to the other to vary the size of such gap therebetween, spring means for urging said one plate toward the other plate, and means for varying the tension of said spring means to vary the amount of compacting force exerted on such strips by said guide member for any predetermined gap width.

7. The apparatus of claim 6 wherein said guide member has stop means to determine the minimum gap between said converging walls.

References Cited

UNITED STATES PATENTS

| | | | |
|---|---|---|---|
| 180,862 | 8/1876 | Fritz | 241—101 X |
| 819,862 | 5/1906 | Cutler | 241—101 |
| 960,027 | 5/1910 | Low | 241—101 X |
| 1,444,395 | 2/1923 | Seigle | 18—19 |
| 1,660,854 | 2/1928 | Armstrong | 83—449 X |
| 1,926,990 | 9/1933 | Schmidt | 83—420 |
| 3,020,687 | 2/1962 | Joa | 241—101 X |
| 3,165,783 | 1/1965 | Martelli | 18—19 |
| 3,169,274 | 2/1965 | Colombo | 18—19 |
| 3,216,059 | 11/1965 | Voelskow | 18—19 X |

FRANK T. YOST, Primary Examiner

U.S. Cl. X.R.

18—19; 83—176, 355, 420, 449, 923; 241—101